United States Patent [19]

Dalrymple et al.

[11] Patent Number: 5,025,412
[45] Date of Patent: Jun. 18, 1991

[54] UNIVERSAL BUS INTERFACE

[75] Inventors: Monte J. Dalrymple, Fremont; Phillip D. Verinsky, San Jose; Don Smith, Los Gatos, all of Calif.

[73] Assignee: Zilog, Inc., Campbell, Calif.

[21] Appl. No.: 157,294

[22] Filed: Feb. 17, 1988

[51] Int. Cl.[5] .......................................... G06F 13/36
[52] U.S. Cl. ............................ 364/900; 364/927.93; 364/940.2
[58] Field of Search ................................ 364/200, 900

[56] References Cited

PUBLICATIONS

Gustauson, D., Computer Buses a Tutorial, 1984, pp. 9, 13–14.
Debod et al., Integrated Circuits and Semi-Conductor Devices, 1977, pp. 208–212.
Floyd, Digital Fundamentals, 1982, pp. 80, 246–269, 410–414, 507–508, 558–559.

Primary Examiner—Gareth D. Shaw
Assistant Examiner—John C. Loomis
Attorney, Agent, or Firm—Majestic, Parsons, Siebert & Hsue

[57] ABSTRACT

A universal bus interface compatible with a number of different bus interface protocols is disclosed. In any given application, the control lines carrying signals by a processor are connected to the appropriate interface signal pins of the bus interface with all unused interface signal pins tied to their inactive level. The bus interface derives a strobe signal from the timing information carried by the control lines from the processor. The strobe signal derived by the interface controls data flow within a peripheral device or data flow between a peripheral device and a processor without the aid of any clock signals. A NAND-gate is used in the interface to derive the strobe signal from processor control signals. The NAND-gate comprises a number of inverters arranged in parallel each located close to an interface input pin to eliminate the need for any logic for driving the gate. The outputs of the inverters are connected to a common node to provide the strobe signal. When the output of an inverter falls from high to low, a feedback loop causes the output of the inverter to be in a high impedance state so that the low state of the output of such inverter does not prevent the NAND-gate output from being pulled to the high state by the output of a different inverter.

6 Claims, 4 Drawing Sheets

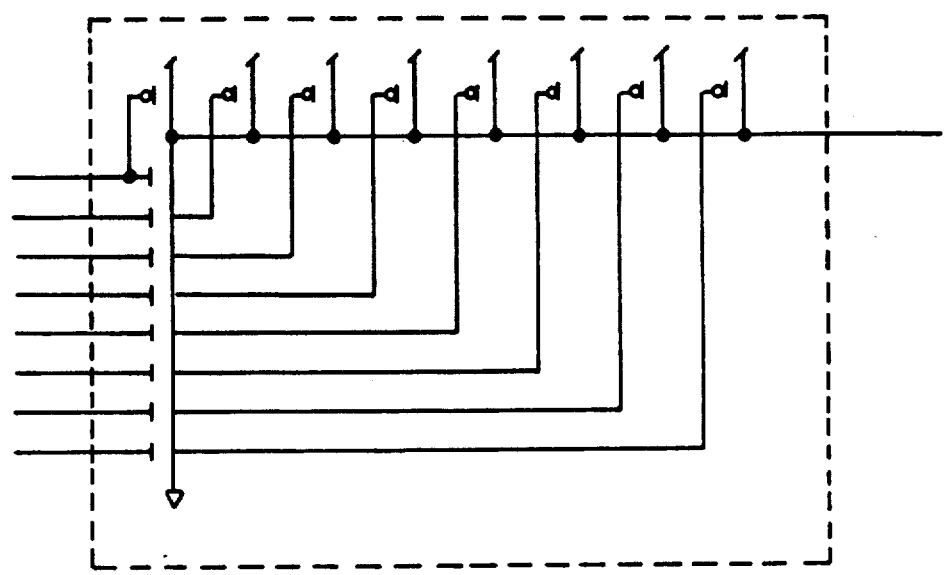
FIG._IA.
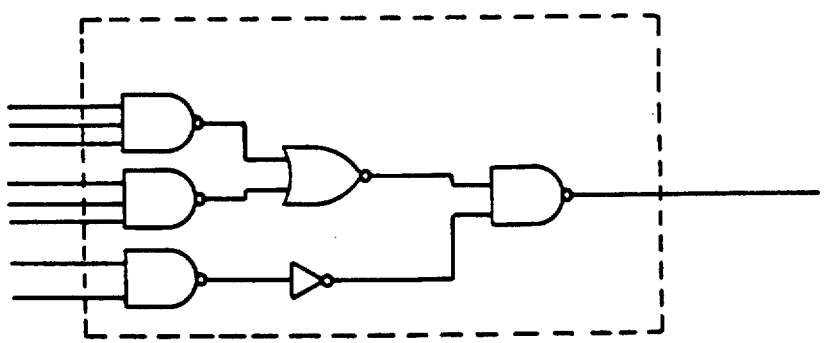
FIG._IB.
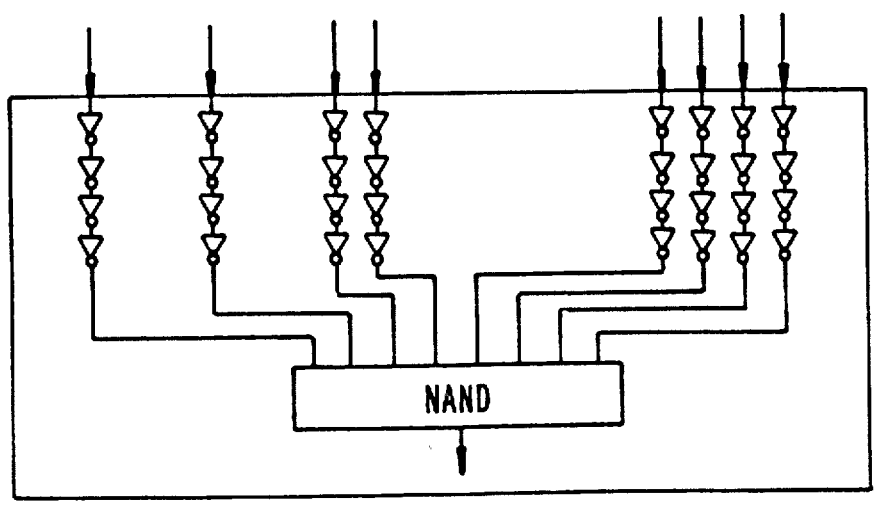
FIG._IC.

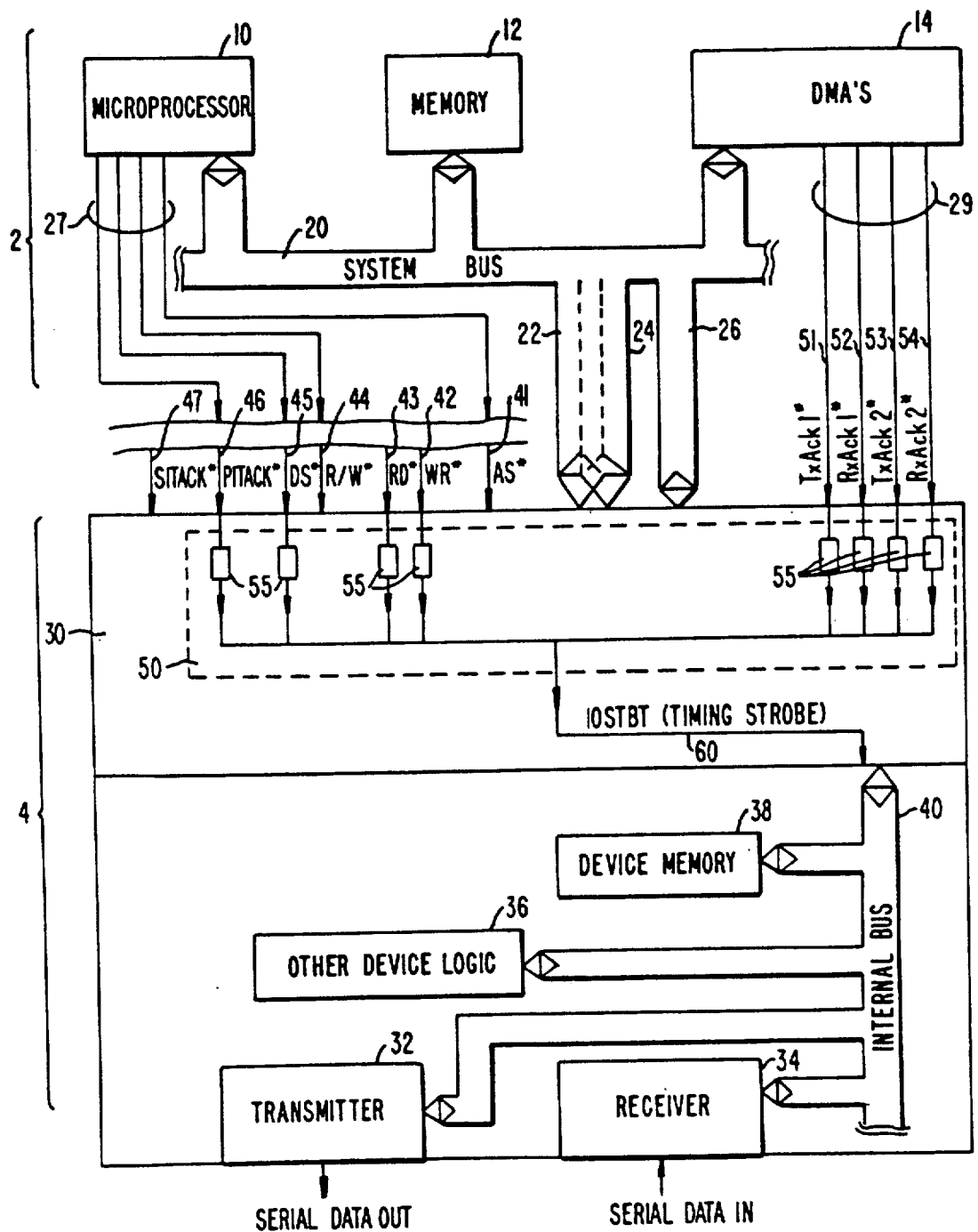
FIG._2.

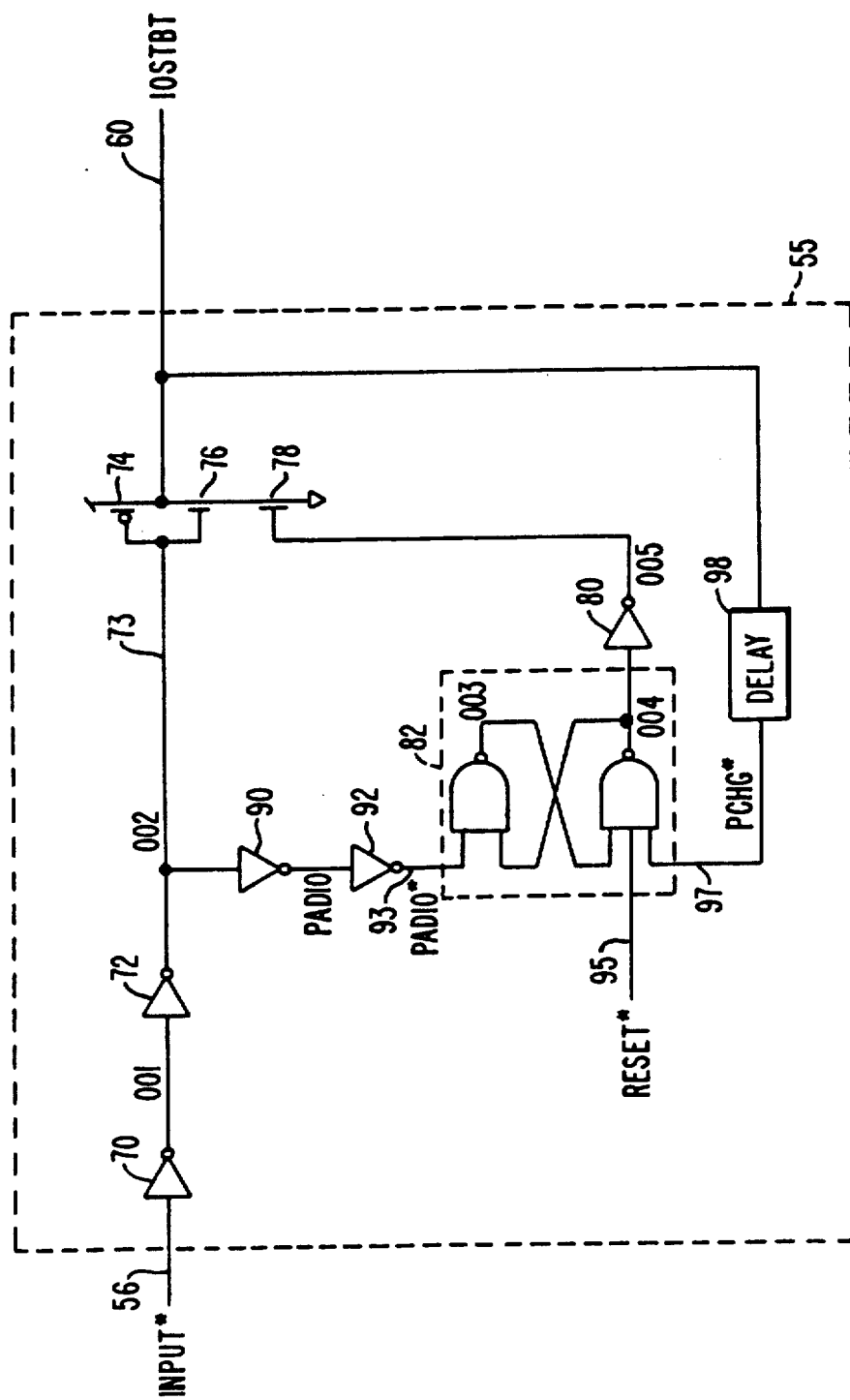
FIG._3.

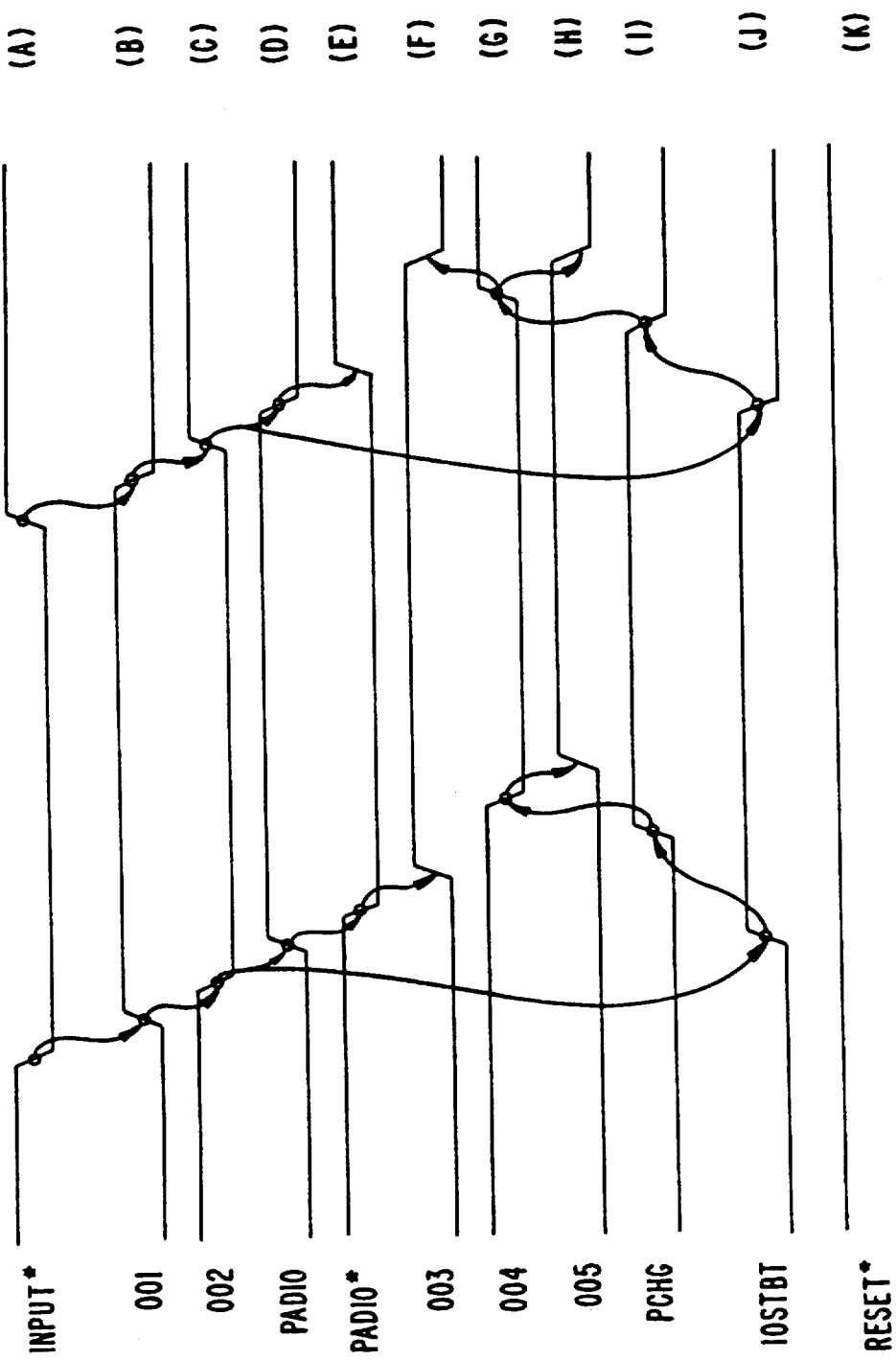
FIG._4.

UNIVERSAL BUS INTERFACE

BACKGROUND OF THE INVENTION

This invention relates in general to digital computer systems and in particular to digital data communication between microprocessors and a peripheral device.

In a computer system, information exchange between its various components are usually effected by means of a common bus. For example, a microprocessor, a memory, a Direct Memory Access device (DMA), and peripheral devices are all connected to the same system bus. Information flow between these components are controlled by a set of control lines which are also carried along the system bus. Generally the control lines serve two functions: one is to specify what type of bus operation is to be performed; the other is to provide timing information to synchronize the transfer operation. Each microprocessor family has its own specific bus interface protocol which is generally different from ones belonging to other families.

However, for most common bus operations, the protocols fall within one of two forms. For data read or write operations, one form of bus interface protocol has the read strobe (RD*) dedicated to reading data, and the write strobe (WR*) dedicated to writing data. The symbol "*" used as a part of the name of a signal in this application indicates that the signal is active low. The alternate form has the timing information for both the read and write operations carried by the data strobe (DS*). The single DS* signal is used in conjunction with the read/write status signal (R/W*) to transfer data in either direction. Prior art bus interfaces are usually designed to cooperate with only one form of bus interface protocol, not both.

When it is necessary for the peripheral device to notify the processor of a transmit or receive operation the peripheral intends to perform, the peripheral sends an interrupt signal to the processor. The processor then sends an interrupt (transmit or receive) acknowledge signal to the peripheral to inform the peripheral that it may begin the intended operation.

Similarly, commonly used bus interface protocols transmit interrupt acknowledge signals also in two alternate forms. One form is the status interrupt acknowledge signal (SITACK*) which merely flags that an interrupt acknowledge cycle is in progress, with the timing information being carried in either RD* or DS*. The alternate form is the interrupt acknowledge strobe signal (PITACK* in short for pulse interrupt acknowledge) which is a strobe that both flags interrupt acknowledge as well as carries the timing information about the cycle.

Also some microprocessors have separate address and data buses but others employ a single multiplexed address/data bus. The multiplexed data bus must be used in conjunction with an address strobe signal (AS*) which is present to latch the address on the address/data bus as well as chip select and channel select information.

Apart from the different ways of implementing the control lines and the timing signals, different microprocessors also may have different timing considerations. For example, some may have the data strobe available early before the data is ready for latching. Others may have the data ready for latching early, with the strobe available later.

With the various incompatible interface requirements of different processors such as those described above, conventional peripheral devices are typically optimized for interface to one particular processor, so that extra efforts and expense may be required for interfacing to other types of processors. When more than one processor interface must be supported either a bonding option or a function select pin is typically used. Both of these approaches require additional logic which compromises speed and flexibility and translates to interfaces which are optimized for no processor.

In prior bus interface protocols, a bus interface is only required to derive a strobe signal from few signals. Thus where the bus interface protocol calls for separate read strobe and write strobe signals as well as interrupt transmit acknowledge and interrupt receive acknowledge signals, a NAND-gate may be used to derive the strobe signal with the four signals enumerated above as inputs to the gate. Since only one of the four signals will be active at any one time a NAND-gate is adequate for deriving the strobe signal. Where the bus interface is required to be compatible with a number of bus interface protocols, the number of inputs to the NAND-gate will be increased to more than four. This requires connecting lines between the gate and interface signal pins on the bus interface spread over a distance on the interface chip. Extra drivers or buffers may be required in order to adequately drive the signals across such distances. Such extra logic causes considerable delay in deriving the strobe signals for operating the peripheral device.

Since the internal strobe signal of the peripheral device is derived from any one of the many possible input control line options, these inputs can be OR'ed together to give the single internal strobe. In terms of negative true logic, a multi-input NAND gate may be used.

Since the NAND gate will have a large number of inputs connected to interface input pins which are spread far apart, the implementation of a NAND gate would normally be impractical also because of size considerations in addition to the delay caused. For example, a two or three input NAND-gate constructed in CMOS would normally have linear dimensions of the order of 20 microns per gate. Increasing the number of inputs to the gate would, of course, increase gate size. If the size of the gate is increased, the gate will have higher capacitance which slows down its operation. Consequently, the size of the gate will have to be increased further to increase its speed. Thus, a brute force extension of the same gate to an 8-input one, as illustrated in FIG. 1A, would result in each gate having linear dimensions of the order of 1,000 microns. Such gate will not only occupy a large area, but also consume much power. Alternatively, as shown in FIG. 1B, it is possible to combine several 2- or 3-input NAND gates together to form an equivalent 8-input NAND gate. However, such configuration would result in the signal having to propagate through three levels of primitive gates resulting in considerable time delay.

Referring to FIG. 1C, another factor for delay due to propagation through a conventional NAND gate is that the variously distributed inputs will have to cover considerable distance to reach the NAND gate which is normally localized inside the chip. This requires substantial drive power from the input buffers. Typically, the input buffers are made up of a level shifter and an inverter, and external interface requirement places an upper limit on the size of these input buffers. In order to drive the signal over a considerable distance into the chip, additional drivers are required. Thus, it is likely that the input signal will have to propagate through four primitive gates to reach the NAND gate itself. If the NAND gate is cascaded into three levels, the input signal will have to go through a total of seven primitive gates.

Accordingly, it is a primary object of the invention to provide a universal bus interface which contains all the signal pins necessary to interface to any one of several different processors, without compromising their performances and without external logic nor options beyond tying of unused signals.

It is another object of the invention to provide an implementation of the NAND-gate which is highly efficient and has minimum delay.

SUMMARY OF THE INVENTION

One aspect of the invention is directed to a universal bus interface which can derive a strobe signal for controlling data flow within the peripheral device, where the interface is capable of deriving the strobe signal from different sets of control signals required by different bus interface protocols. Thus the universal bus interface is provided with means for accepting all of the signals necessary to interface with any one of the bus interface protocols. In any given application, the control lines carrying those signals provided by the processor (and as required by a particular bus interface protocol) are connected to the appropriate interface signal pins of the bus interface with all unused interface signal pins tied to their inactive level.

The strobe signal derived by the universal bus interface contains timing information so that it can strobe data within the peripheral device or between the peripheral device and a processor without the aid of any clock signals. This is advantageous since it eliminates the need for clock signals for operating the interface, simplifies design and manufacturing and reduces cost. This feature is particularly advantageous where the peripheral device also requires no clock signals so that the timing of the different operations performed by the bus interface and the peripheral device are controlled by the timing information carried by the control lines connected to the interface signal pins of the bus interface.

Thus, according to one aspect of the invention, the bus interface derives a first strobe signal from some of at least six signals from processors. The six signals include four signals containing timing information which is used by the interface in deriving the strobe signal. In the preferred embodiment, these six signals include separate dedicated read strobe and write strobe signals, data strobe signals and read/write status signals used in conjunction, status acknowledge signals used in conjunction with the data strobe signals or the read strobe signals, and interrupt acknowledge strobe signals. Only one of the four strobe signals (read strobe, write strobe, data strobe and interrupt/acknowledge strobe signals) containing timing information is active at any one time. Some of the at least six signals are used together in different combinations in a variety of bus interface protocols so that the interface is compatible with each of the variety of bus interface protocols. The first strobe signal contains timing information and is used in the peripheral device for synchronizing transactions in the device without using any clocks. For example, the strobe signal may be used to strobe data between a memory and an internal bus in the peripheral device without the aid of any clock signals.

Another aspect of the invention is based on the observation that the extra logic and time delay inherent in the use of a NAND-gate with many inputs can be reduced by using a distributed configuration of the NAND-gate. The NAND-gate used comprises a number of modules arranged in parallel where the number of modules matches the number of inputs of the NAND-gate. In the preferred embodiment, each module comprises an inverter. The inputs of the inverters are the inputs of the gates and the outputs of the inverters are connected to a common node which provides the output of the gate. Since the NAND-gate is no longer physically located at one location but is distributed into a number of inverters, each inverter may be placed close to the interface input pin from which it receives its input signal. Therefore no extra logic will be required to drive the inverters and propagation delay in deriving the strobe signal is much reduced. The outputs of the inverters are connected to a common node. If the inverters are placed close to their input signal pins, the inverters will be spaced apart from one another so that connecting lines will be required to connect the outputs of the inverters to the common node. Since the inverters can be designed with adequate power to drive the output over such distances, no extra logic is required to drive the inverter output.

The various aspects of the present invention described herein are being commercially embodied in the Z16C30 CMOS USC universal serial controller of Zilog, Inc., Campbell, California, assignee of the present application.

Additional objects, features and advantages of the present invention will become apparent from the following description of a preferred embodiment thereof, which description should be taken in conjunction with the accompanying drawings.

BRIEF DESCRIPTION OF THE DRAWINGS

FIGS. 1A, 1B and 1C illustrate a conventional implementation of a multi-input NAND gate;

FIG. 2 is a schematic block diagram of a digital computer system illustrating the bus interface between a microprocessor, memory, DMA's, and the peripheral device to illustrate the preferred embodiment of the invention;

FIG. 3 is the circuit diagram of a distributed NAND-gate according to the preferred embodiment of the invention; .

FIG. 4 is the timing diagrams of the circuit of FIG. 3.

DETAILED DESCRIPTION OF A PREFERRED EMBODIMENT

FIG. 2 illustrates a microprocessor system 2 interfacing with a peripheral device 4 according to the present invention.

The microprocessor system 2 has a microprocessor 10, memory 12, direct memory access devices (DMA's) 14, exchanging information via a system bus 20.

Peripheral device 4 includes an universal bus interface 30, a transmitter 32, a receiver 34, device logic 36 and device memory 38, all of which are interconnected via internal bus 40.

Peripheral device 4 communicates with the microprocessor system with its bus interface 30 connected to the system bus 20. Typically bus 20 carries Data lines 22, Address lines 24 as well as Control lines 26, 27, 29.

Only those Control lines of interest to this discussion such as the bundle of lines 27 issuing from the microprocessor 10 and the bundle of lines 29 issuing from the DMA's 14 are shown explicitly. The rest of the Control lines are generically represented by the Other Control lines 26.

In order for the peripheral device 4 to be able to interface with a large variety of microprocessors, its universal bus interface 30 must have available all possible pins for direct connection to any of the common microprocessors.

For bus transaction types, some microprocessors have separate Data lines 22 and Address lines 24, while others have multiplexed Address/Data lines 22, 24. In the case of multiplexed lines, another control line 41 carrying address strobe signal AS* is employed to provide the status and timing of the bus transaction. When AS* is High, it signifies that data is available on the bus 20. After AS* goes Low, the rising edge of AS* latches the register address of bus interface 30 on the Address-/Data bus 22, 24. Thus, the universal bus interface 30 has pins available for connection to control line 41 of microprocessors which employ such bus interface protocol.

Similarly for read and write bus transactions, microprocessor 10 is shown in FIG. 2 as using the timing information in data strobe signal DS* carried on line 45 for both read and write transactions which are selected by the status of status signal R/W* carried on line 44. However, a different microprocessor using a different bus interface protocol may instead use lines 42, 43 to carry write strobe and read strobe signals WR* and RD* with timing information for timing their respective transactions. Thus, to be compatible with both bus interface protocols, the universal bus interface 30 will have available pins for connection to possible control lines 42, 43, 44 and 45.

For microprocessor interrupt acknowledge, one type of microprocessor will carry the timing information in a dedicated control line 46 to carry the signal PITACK*, while another type of microprocessor may carry the status information in a control signal SITACK* on line 47 and the timing information in either DS* or RD*. Thus provision is made on the bus interface 30 to accept possible control lines 46, 47.

For transfer of information between the microprocessor system memory 12 and the peripheral 4, DMA's 14 are usually employed to manage the transfer without requiring the attention of microprocessor 10. In the preferred embodiment the peripheral device 4 has two channels, each able to transmit and receive serial data. For channel 1, strobe signals from DMA's carried along TxACK1* and RxACK1* on lines 51, 52 provide the timing for the two-way transfer of information between the microprocessor system memory 12 and the peripheral device 4. Similarly, TxACK2*, RxACK2* on lines 53, 54 do the same thing for channel 2.

From the foregoing description, the timing for the bus transactions between memory 12 of the microprocessor system 2 and the peripheral device 4 is carried by any one of the control lines 42, 43, 45, 46, 51, 52, 53 and 54. At the universal bus interface 30 all the eight strobe lines are OR'ed by means of a NAND gate 50 (negative true logic) to obtain one timing strobe IOSTBT at output 60. This single timing strobe IOSTBT 60 is used to initiate the transactions between the internal bus 40 of device 4 and the system bus 20 on the one hand, and the transaction of internal bus 40 and device memory 38 of device 4 on the other hand.

As discussed above, having one localized NAND gate would necessitate driving the many widely spread inputs over greater distances on the chip. The extra drivers required would also add extra delay to the strobe signals thereby degrading the speed performance of the interface. One feature of the present invention is to provide a fast multi-input NAND gate to implement a high performance universal interface. The non-localized NAND gate comprises a number of modules distributed over a wider area in the interface and located close to the input pins of the interface. In this way, the inputs need not be driven over large distances on the chip whereas the output of each module may be designed with enough drive capability for all of them to be tied at a distant localized point in the chip.

Referring to FIG. 2, the multi-input NAND gate 50 is made up of a number of identical modules 55. Each module 55 is located close to one of the input pins of the peripheral device 4. The outputs of each module 55 are tied together to form one single output which carries the timing strobe IOSTBT at output 60.

FIG. 3 shows the details of one of the modules 55. Essentially when an external timing strobe appears, INPUT* at 56 goes Low. This is propagated through three gates 70, 72 and 74 or 76 to emerge as a slightly delayed signal in the form of IOSTBT at NAND-gate output 60. The first gate encountered by the external strobe signal is a level shifter 70. It serves to convert the input TTL signal levels to those of CMOS. Gate 70 is limited in size in order to keep the input capacitance within bounds of normal input driving currents. Thus gate 70 itself has limited driving capability and must be buffered by gate 72 before it is able to drive gates 74 or 76.

FIG. 4 is the timing diagram for the circuit of FIG. 3. In particular, FIG. 4(A), 4(B), 4(C) and 4(J) show the propagation of INPUT* through module 55 to emerge as IOSTBT at 60. Referring to both FIG. 3 and FIG. 4, when INPUT* goes Low it emerges out of the level shifter 70 as High and then through buffer 72 to come out as Low. This turns on the P-transistor 74 and turns off the N-transistor 76. Thus the output IOSTBT at 60 is pulled up to High.

At any time only one of the eight modules 55 will receive a timing strobe resulting in its output IOSTBT going High. The remaining seven modules 55 will have their inputs at inactive High. This results in their outputs IOSTBT being at Low. Since all the eight outputs IOSTBT are tied together at a common node 60, provision is made to enable the single High to be able to override the rest of the Low's. This is essentially done by "floating" the non-High IOSTBT's by disabling their active pull-down.

Referring to FIG. 3, when INPUT* at 56 is at inactive High, High appears at 73 which turns off the P-transistor 74 and turns on the N-transistor 76. The turning on of N-transistor 76 is subjected to the transistor switch 78 through which 76 is connected to ground. Thus when switch 78 is turned off, N-transistor 76 cannot possibly be pulled down to ground, and output IOSTBT is floated. Transistor switch 78 is itself controlled via a buffer 80 by the output of a RS* latch 82. The output state of RS* latch 82 depends on the state of its three inputs, 93, 95, 97.

As described earlier, a low going strobe signal at INPUT* at 56 will force its output IOSTBT High. At the same time that IOSTBT signal goes High, INPUT* signal at 56 is buffered and delayed through gates 90, 92 to enter Set* input 93 to force RS* latch 82 to be set. In the meantime, the rising edge of IOSTBT, after being delayed at 98, enters Reset* input 97 to reset latch 82. This makes the latch output Low and therefore turns on transistor 78 which in turn allows N-transistor 76 to pull IOSTBT down when the input strobe signal rises again. The timing of this circuit is shown in FIG. 4 (A), (C), (E), (F), (G), (H) and (J). After the falling edge of IOSTBT has subsided, node 60 must be returned to an "open" or high impedance state so that it will not forcibly tie down the line to a Low. This means gate 78 will have to be disabled. This is done by resetting latch 82 with the trailing edge of IOSTBT which has been delayed by some gates 98. The delayed signal enters Reset* input 97 of latch 82 and makes its output High. This propagates through inverter 80 to disable gate 78. The timing of this is shown in FIG. 4 (J), (I), (G) and (H).

Gate 78 may also be disabled in the event of a system reset. FIG. 3 shows RESET* as another Reset* input 95 to latch 82. RESET* is normally held a inactive High. In the event of a reset, RESET* will go Low which will reset latch 82 making its output High. This will disable gate 78 and thus disconnect N-transistor 76 from ground.

As will be apparent from the above and from FIG. 3, there are only three gates between INPUT* signal and output IOSTBT as opposed to seven gates in the NAND-gate of FIG. 1C. Therefore the size of each module 55 on a chip is manageable and the speed performance of the interface will not be severely degraded by the NAND-gate despite its eight inputs. This is particularly advantageous where the microprocessor has data ready for latching early, so that the earlier availability of the strobe signal IOSTBT speeds up transactions when the universal interface is used to interface with such microprocessor.

The design for the NAND-gate of this application can be extended to cover NAND-gates with less or more than eight inputs; all such configurations are within the scope of the invention. While an inverter is shown in FIG. 3 to implement module 55 of FIG. 2, it will be understood that other implementations of module 55 may be used and are within the scope of the invention. The invention has been illustrated with a bus interface deriving a strobe signal from ten signals eight of which contain timing information; obviously the interface can be used to derive a strobe signal in essentially the same manner from a different number of signals a fraction of which contain timing information. While the invention is illustrated using particular interface protocols (dedicated read strobe, write strobe, data strobe, interrupt acknowledge strobe, transmit and receive acknowledge strobe signals), the interface will function in the same manner to derive a strobe signal from simply a number of input signals some containing timing and some containing status information irrespective of the particular interface protocol involved. All these variations are within the scope of the invention.

Although the various aspects of the present invention have been described with respect to its preferred embodiments, it will be understood that the invention is to be protected within the scope of the appended claims

We claim:

1. A universal bus interface for interfacing a peripheral device via a bus with a current microprocessor system, the current microprocessor system being any one from a predetermined group of microprocessor systems, each microprocessor system in the predetermined group having a set of strobe signals for timing bus transactions, each strobe signal being in either an asserted state or an unasserted state and at any one time at most one strobe signal among the set of strobe signals of the current microprocessor system is being asserted, said bus interface comprising:

a plurality of input means, each corresponding to and responsive to a possible strobe signal among the predetermined group of microprocessor systems, such that those input means not corresponding to and not connecting to the current microprocessor are at the unasserted state, and those input means corresponding to and connecting to receive the strobe signals of the current microprocessor system are driven by the strobe signals according to the states thereof;

a plurality of driver modules, each having an input end adjacent and connected to a corresponding input means, and an output end, each of said driver modules responsive to the state at its input end and the state at its output end for driving the output end (1) to the asserted state when the input end is at the asserted state and the output end is at the unasserted state, (2) to the unasserted state when the input end is at the unasserted state and the output end is at the asserted state, and (3) to an electrically floating state when the input end is at the unasserted state and the output end is at the unasserted state; and an output means connected to the output ends of the plurality of driver modules for deriving a strobe signal therefrom such that when an asserted state appears at one of the plurality of driver modules, the output means is pulled to the asserted state, whereby the strobe signals of the current microprocessor system received at the input means producing a universal strobe signal at the output means suitable for timing bus transactions or strobing data in a peripheral device without a system clock.

2. The universal bus interface of claim 1, wherein the predetermined group of microprocessor systems having sets of strobe signals that includes a read strobe, a write strobe, a data strobe and an interrupt acknowledge strobe.

3. A universal bus interface for interfacing a peripheral device via a bus with a current microprocessor system, the current microprocessor system being any one from a predetermined group of microprocessor systems, each microprocessor system in the predetermined group having a set of strobe signals for timing bus transactions, each strobe signal being in either an asserted state or an unasserted state and at any one time at most one strobe signal among the set of strobe signals of the current microprocessor system is being asserted, said bus interface comprising:

a plurality of input means, each corresponding to and responsive to a possible strobe signal among the predetermined group of microprocessor systems, such that those input means not corresponding to and not corresponding to the current microprocessor are at the unasserted sate, and those input means corresponding to and connecting to receive the strobe signals of the current microprocessor system are driven by the strobe signals according to the states thereof;

a plurality of driver modules, each having an input end adjacent and connected to a corresponding input means, and output end, each of said driver modules responsive to the state at its input end and the state at its output end for driving the output end (1) to the asserted state when the input end is at the asserted state and the output end is at the unasserted state, (2) to the unasserted state when the input end is at the unasserted state and the output end is at the asserted state, and (3) to an electrically floating state when the input end is at the unasserted state and the output end is at the unasserted sate; and an output means connected to the output ends of the plurality of driver modules for deriving a strobe signal therefrom such that when an asserted state appears at one of the plurality of driver modules, the output means is pulled to the asserted state, whereby the strobe signals of the current microprocessor system received at the input means producing a universal strobe signal at the output means suitable for timing bus transactions or strobing data in a peripheral device without a system clock and each said driver module further comprising:

a first switching means responsive to an asserted state at the input end for pulling the output end to a first reference voltage source, said first reference voltage source corresponding to the asserted sate;

a second switching means responsive to an unasserted state at the input end for switching the output end to an electrically floating node;

logic means responsive to the state at the input end and the state at the output end for producing a control signal; and a third switching means responsive to the control signal for switching the electrically floating node to a second reference voltage source corresponding to the unasserted state, said control signal being responsive to an immediately earlier signal at the output end such that it turns on the third switching means soon after the output end has switched to the asserted state, thereby enabling the output end to be pulled to the second reference voltage, and turns off the third switching means soon after the output end has switched from the asserted state back to the unasserted state, thereby preventing the output end from being pulled to the second reference voltage.

4. The universal bus interface of claim 3, wherein the predetermined group of microprocessor systems having sets of strobe signals that includes a read strobe, a write strobe, a data strobe and an interrupt acknowledge strobe.

5. The universal bus interface of claim 3, wherein:
said first, second and third switching means are transistors, said first transistor has a complementary polarity relative to that of said second and third transistors; and
said logic means is a set-reset latch.

6. The universal bus interface of claim 3, wherein the predetermined group of microprocessor systems having sets of strobe signals that includes a read strobe, a write strobe, a data strobe and an interrupt acknowledge strobe.

* * * * *

UNITED STATES PATENT AND TRADEMARK OFFICE
CERTIFICATE OF CORRECTION

PATENT NO. : 5,025,412

DATED : June 18, 1991

INVENTOR(S) : Monte J. Dalrymple, Phillip D. Verinsky, Don Smith

It is certified that error appears in the above-identified patent and that said Letters Patent is hereby corrected as shown below:

Column 8, line 63, in Claim 3: replace "corresponding" with --connecting--

Column 9, line 3, in Claim 3: insert --an-- before "output"

Column 10, lines 7-9, in Claim 3: delete "being responsive to an immediately earlier signal at the output end such that it" after "signal" (on line 7)

Column 10, line 10, in Claim 3: delete "soon" after "means"

Column 10, line 13, in Claim 3: delete "soon" after "means"

Signed and Sealed this

Thirteenth Day of October, 1992

Attest:

DOUGLAS B. COMER

*Attesting Officer*   Acting Commissioner of Patents and Trademarks